UNITED STATES PATENT OFFICE.

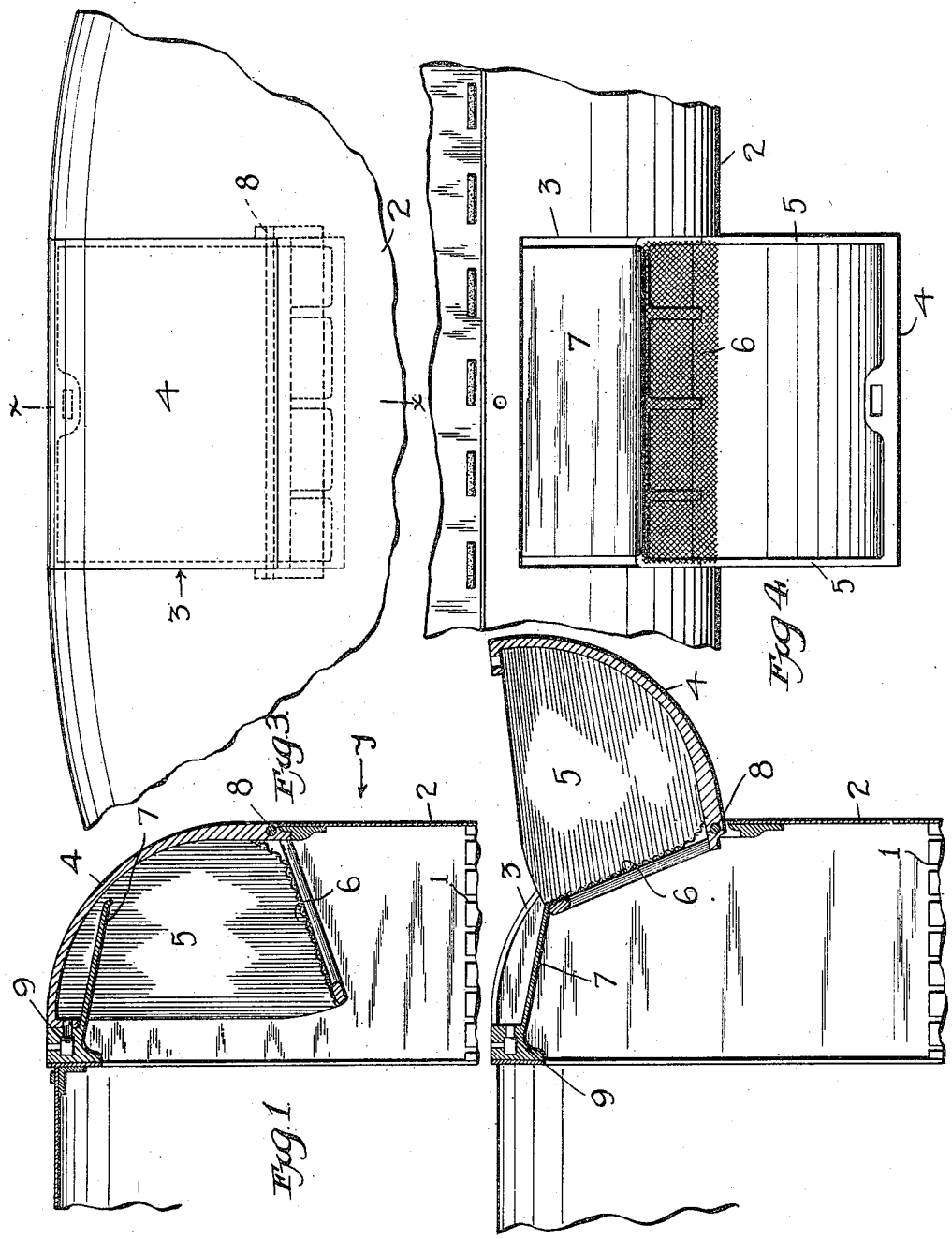

CHARLES RIVERS CARROLL, OF NEW YORK, N. Y.

AUTOMOBILE-RADIATOR CAP AND FUNNEL.

1,243,138.          Specification of Letters Patent.      Patented Oct. 16, 1917.

Application filed September 16, 1915. Serial No. 50,957.

*To all whom it may concern:*

Be it known that I, CHARLES RIVERS CARROLL, a citizen of the United States of America, and resident of New York city, in the county of New York and State of New York, have invented certain new and useful Improvements in Automobile-Radiator Caps and Funnels, of which the following is a specification.

This invention relates to an improvement in radiator filling devices and caps for the same, and has for its object the providing of means whereby a radiator cap may be readily opened for purposes of filling with liquid, the cap serving as a trough through which the liquid is led to the radiator, and when closed forming part of the radiator casing in such a way as to be at once useful and ornamental.

I have illustrated my invention in the accompanying drawings, designating the parts by numerals and referring to like parts by like numerals.

Figure 1 is a vertical section taken on the line *x—x* of Fig. 3, showing the device as closed. Fig. 2 is the same showing the device opened. Fig. 3 is an elevation taken in the direction of the arrow *y*, Fig. 1, showing the device closed. Fig. 4 is a plan view of Fig. 2.

A diagrammatic view of the radiator is shown at 1. 2 is a casing mounted on the radiator and communicating therewith, so that liquid poured into the casing will flow into the radiator tubes. 3 is an aperture formed in the casing 2, while 4 is one wall of a receptacle adapted to fit into and close the aperture 3 in the casing 2. The receptacle referred to comprises the outer wall 4 with two side walls 5—5 projecting perpendicular from the outer wall 4. 6 is a screen mounted between the disengaged edges of the walls 5—5. 7 is an apron preferably secured on the interior upper edge of the casing adjacent the aperture 3 and projecting into the casing between the walls 5—5, and of a length sufficient to engage the upper edge of the screen wall when the device is opened. The receptacle comprising the walls 4, 5 and 6 is pivoted at the lower edge of the aperture 3 as at 8. 9 is a locking device adapted to engage the upper end of the wall 4 when said wall or section is closed in contact with said lock.

The operation of the device is as follows:—When it is desired to fill the radiator, the receptacle is opened from the position as shown in Fig. 1 into the position as shown in Fig. 2, in which case the apron 7 engages the upper edge of the screen wall 6 and holds the same in that position. Liquid from a bucket or other receptacle having a large mouth may be thrown into this receptacle and should any of the liquid fall on the apron 7, it will be guided in front of the screen 6; the liquid passes through the screen 6, thence through the casing 2 into the radiator 1. Any refuse caught by the screen 6 will fall back into the receptacle and may be readily removed therefrom. When the operation of filling is concluded, the receptacle is closed in the position shown in Fig. 1 and locked at 9, and when so locked, the wall 4 fills the aperture 3 and appears to become a part of the casing 2. Thus the homogeneous appearance of the entire casing is unbroken and any objectionable features incident to the appearance of a funnel tube is removed.

What I claim is:—

1. An automobile radiator having a casing mounted thereon and communicating therewith, an aperture in said casing, a receptacle pivoted at the lower edge of said aperture and of a form when closed to complete the contour of the casing, one wall of said receptacle fitted with a screen and one wall open to receive liquid, the other walls closed to receive and guide the flow of the liquid.

2. An automobile radiator having a casing mounted thereon and communicating therewith, an aperture in said casing, a receptacle pivoted at the lower edge of said aperture and of a form when closed to complete the contour of the casing, one wall of said receptacle fitted with a screen and one wall open to receive liquid, the other walls closed to receive and guide the flow of the liquid, an apron protruding from the upper edge of said aperture adapted to engage the upper edge of the screen wall of said receptacle when it is opened.

3. An automobile radiator having a casing mounted thereon and communicating therewith, an aperture in said casing, a receptacle pivoted at the lower edge of said aperture and of a form when closed to complete the contour of the casing, one wall of said receptacle fitted with a screen and one wall open to receive liquid, the other walls closed to receive and guide the flow of the liquid, with means to support said receptacle when open and to lock the same when closed.

4. An automobile radiator having a casing mounted thereon and communicating therewith at the base of said casing and top of the radiator, an aperture in the forward top side of said casing, a receptacle having walls, one wall forming a section of the casing and adapted to fill said aperture, two walls projecting perpendicular to said last mentioned wall, with a screen interposed between them at the outer edges thereof, the remaining wall being open to receive liquid, said receptacle pivotally secured at the point of juncture of all of said walls to the lower edge of said aperture, with means to support the receptacle when open and lock the same when closed.

Signed by me at New York city, N. Y., this 15th day of September, 1915.

CHARLES RIVERS CARROLL.

Witnesses:
CHARLES D. EDWARDS,
ANNA T. DAVIDSON.

Copies of this patent may be obtained for five cents each, by addressing the "Commissioner of Patents, Washington, D. C."